(Model.)
H. B. RUSLER.
CHAIN PUMP BUCKET.
No. 246,213. Patented Aug. 23, 1881.
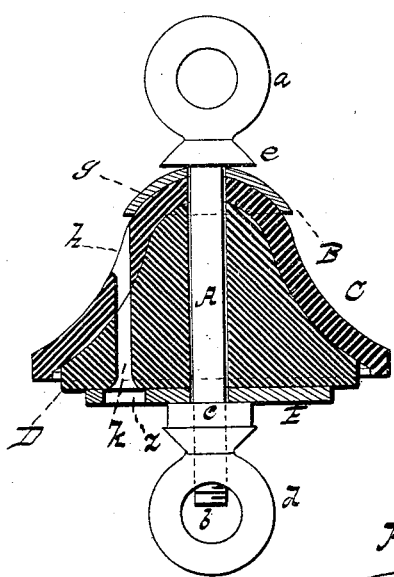
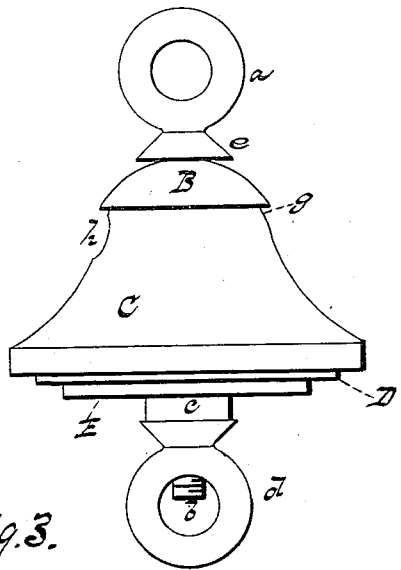
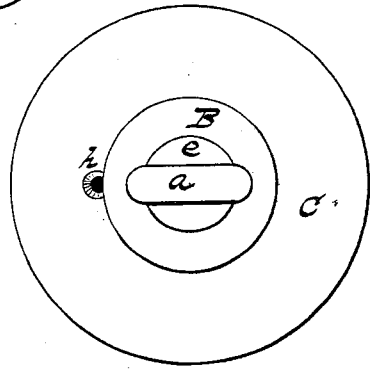
WITNESSES
INVENTOR
H. B. Rusler,
by Anderson Smith
his ATTORNEYS

UNITED STATES PATENT OFFICE.

HENRY B. RUSLER, OF JOHNSTOWN, OHIO.

CHAIN-PUMP BUCKET.

SPECIFICATION forming part of Letters Patent No. 246,213, dated August 23, 1881.

Application filed June 11, 1881. (Model.)

*To all whom it may concern:*

Be it known that I, HENRY B. RUSLER, a citizen of the United States, resident of Johnstown, in the county of Licking and State of Ohio, have invented a new and valuable Improvement in Chain-Pump Buckets; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical section of my device. Fig. 2 is a side elevation, and Fig. 3 is a plan view.

This invention has relation to chain-pump buckets; and it consists in the construction and novel arrangement of the outer concave rubber and the inner core-rubber fitting the same, of the drip-perforations through said outer and inner rubbers and through the pressure plate or washer under the inner rubber, and of the brass burr on the threaded stem of the valve or bucket, above the lower eye, all as hereinafter shown and described.

In the accompanying drawings, the letter A designates the stem of the bucket, having the eye $a$ at its upper end, and threaded at its lower end, $b$, to receive a brass burr, $c$, and the lower eye, $d$.

B indicates a concave metallic cap or shell, which is placed on the stem A, next to the shoulder $e$, under the upper eye.

C is the concave conical-shaped rubber valve, which is made rounded on top and is centrally perforated for the passage of the stem. The rounded top $g$ of this valve is designed to extend upward into the concavity of the cap or shell B.

D represents the inner and lower portion of the valve. This is the more solid part or core, and is also made of rubber, in conical form, and shaped to fit neatly the conical interior of the valve C. The conical exterior surfaces of the valve and core, as well as the conical interior surface or concavity of the former, are somewhat bell-shaped or flaring at their lower portions and rounded above, as indicated in the drawings.

Under the base of the rubber core D is the metallic pressure-plate or washer E, which is designed to be placed on the stem A, under the base of the core, through which said stem A also passes.

Through the valve C, at one side, between its central perforation and margin, is made a drip-hole, $h$, and through the core D, below and within the valve, is made a corresponding drip-hole, $k$, which is designed to register with the valve-drip $h$ when the rubber parts are properly arranged on the stem. A perforation, $z$, in corresponding position, is made through the washer E, so that when said perforation is made to register with the drip-holes of the rubber parts above there will be a free passage for the water. By turning the plate E the flow may be wholly or partially cut off, according to requirement.

Under the washer E is the burr $c$, which is made of brass, usually, so that it will not be liable to become unmanageable on account of rust. By turning this burr upward on the threaded stem the washer E will be pressed against the rubber core D, expanding the latter, which will at the same time expand the concave valve C. The action of the rubber core is designed to produce a general expansion of the concave rubber C, which fits over it, the upper part, as well as the lower and marginal portion, being affected so that the concave rubber will not curl over, but will have its edge expanded directly outward. In this manner it is designed to preserve the elasticity of the rubber under expansion.

This rubber bucket is essentially pliable and elastic, and will readily adapt itself to uneven places in the tubing, so that there will always be perfect suction.

Having described this invention, what I claim, and desire to secure by Letters Patent, is—

1. A bucket for chain-pumps, consisting of the threaded stem A, the concave rubber valve C, the rubber core D fitting within the same, the cap B and washer E, and the burr $c$, substantially as specified.

2. In a chain-pump bucket, the concave rubber C and core-rubber D, having the respective registering drip-holes $h$ and $k$, and the pressure-plate or washer E, having the corresponding perforations $z$, substantially as specified.

3. The combination, with the threaded stem A and the rubber valve, its core, and washer, of the pressure-plate E and the burr $e$ on said stem, above the lower eye, substantially as specified.

In testimony that I claim the above I have hereunto subscribed my name in the presence of two witnesses.

HENRY B. RUSLER.

Witnesses:
H. J. BUXTON,
JOHN STEVENS.